(12) United States Patent
Kajino et al.

(10) Patent No.: US 6,850,374 B2
(45) Date of Patent: Feb. 1, 2005

(54) LENS SELECT DEVICE AND PORTABLE INFORMATION TERMINAL

(75) Inventors: Tetsurou Kajino, Tokyo (JP); Jouji Wada, Yokohama (JP); Takashi Kusakari, Yokohama (JP); Takuya Imaoka, Yokohama (JP); Tetsuya Ida, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/434,016

(22) Filed: May 8, 2003

(65) Prior Publication Data
US 2003/0214732 A1 Nov. 20, 2003

(30) Foreign Application Priority Data
May 9, 2002 (JP) .................................. P. 2002-134328

(51) Int. Cl.7 .............................. G02B 7/02; G02B 23/00
(52) U.S. Cl. .................... 359/821; 359/823; 359/399
(58) Field of Search .............................. 359/813, 821, 359/811, 818, 823, 824, 399, 405

(56) References Cited

U.S. PATENT DOCUMENTS 5,128,808 A * 7/1992 Dosaka ....................... 359/821
5,815,328 A * 9/1998 Makita ....................... 359/824

FOREIGN PATENT DOCUMENTS

| JP | 2000-307715 | 11/2000 |
| JP | 2001-92786 | 4/2001 |

* cited by examiner

Primary Examiner—Loha Ben
(74) Attorney, Agent, or Firm—Pearne & Gordon LLP

(57) ABSTRACT

To provide a lens select device in which an iris image pickup function may be incorporated into a portable information terminal at low cost.

In a lens support member 34, a small gear 51 is formed at one end part of the lens support member, and a lens-housing boss part 53 and a lens-housing boss part 54 are juxtaposed at the other end part. By turning the small gear 51, the first lens or the second lens is aligned with a predetermined position. An operation part 59 is provided. When the operation part 59 engages with the small gear 51 and turns the same, the operation part 59 switches the lens which is aligned with the predetermined position to the first lens or the second lens. Preferably, the operation part 59 is an arcuate member which turns about a position, which is different from a rotational center of the small gear 51, and it is an inscribed gear 59 having teeth formed in the inner peripheral surface, which are in mesh with the small gear 51.

8 Claims, 6 Drawing Sheets

FIG. 1A
FIG. 1B
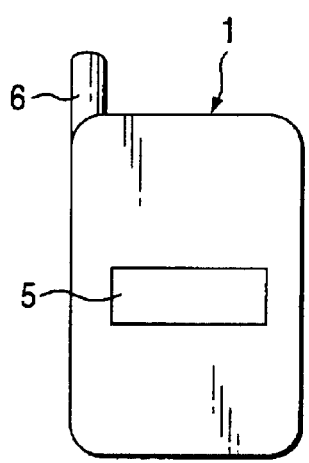
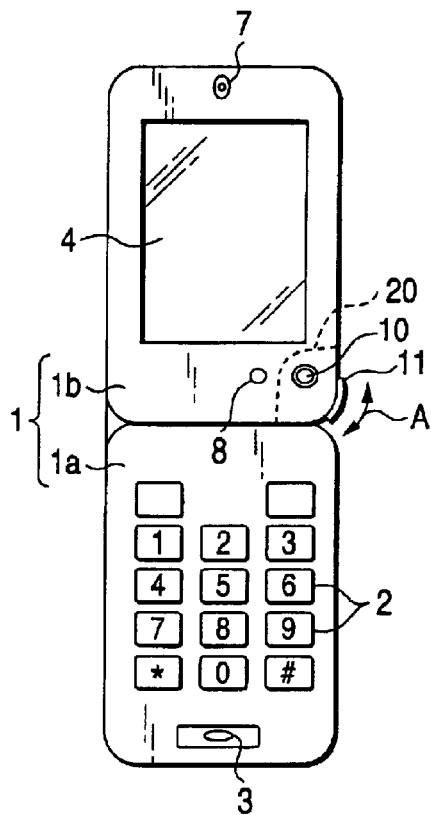
FOLDED STATE
UNFOLDED STATE
FIG. 2
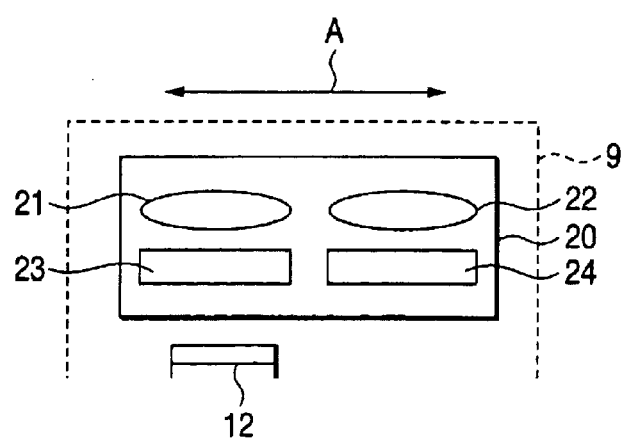

LENS SELECT DEVICE AND PORTABLE INFORMATION TERMINAL

BACKGROUND OF THE INVENTION

1. Field of the Invention

The present invention relates to a lens select device and a portable information terminal. More particularly, the invention relates to a lens select device and a portable information terminal which enable a telescopic image, such as an iris image, and a wide angle image, such as a scenery image and a face image, to both be picked up by lens selection.

2. Description of the Related Art

Prevalence of portable information terminals, such portable telephone sets and PDAs (personal digital assistants) is remarkable. For example, a credit card function and a money card function are incorporated into the portable telephone set. A user accesses a shopping site on the internet and makes purchases at the shopping site. In this case, a problem that arises is the theft of the portable telephone set by another person. In one of the ways to prevent the theft by another person, an individual authentication function is incorporated into the portable telephone set. Only when the individual is authenticated, use of the portable telephone set is permitted or the shopping is permitted.

In prior techniques as disclosed in JP-A-2001-92786 and JP-A-2000-307715, a function to authenticate an individual with the iris or fingerprint is incorporated into the portable telephone set. The portable telephone verifies whether or not a current possessor of the portable telephone set is authorized, and prohibits other possessors than the authorized one from using the portable telephone set.

A method of authenticating a person with his iris will find a use in many different environments since an electronic camera is mounted on a portable telephone set and an iris of the user is merely picked up. An iris pick-up camera must be a telescopic camera of a narrow field angle since it picks up an iris pattern. The iris image is best clear in the near infrared wavelength region. Accordingly, it is necessary to attach a visible light cut filter to the lens.

The portable telephone set that is used as a television telephone or is capable of picking up a scenery image and sending it to a called party become wodely used. The wide angle camera is wider in field angle than the telescopic camera, and when an infrared light cut filter which permits visible light to pass therethrough but inhibits infrared light from passing therethrough, is attached to the lens, a clearer image can be picked up.

The telescopic camera for picking up the iris image is incompatible with the wide angle camera for picking up the scenery image in many points. Accordingly, it is difficult to house the two cameras into the housing of the small portable telephone set, and the cost to manufacture increases. To cope with this, the following measure may be taken. The image pick-up device, such CCD, is commonly used for both the cameras. Two lenses, a wide angle lens and a telescopic lens, are provided for the lens disposed in front of the image pick-up device. Either of those lenses is selected by a lens select device. In this case, it is desired that the lens select device may be installed in a narrow space, and the lens select operation is easy and reliable.

SUMMARY OF THE INVENTION

Accordingly, an object of the present invention is to provide a lens select device which is capable of smoothly switching between the telescopic lens and the wide angle lens even if it is installed in a narrow space, and a portable information terminal having both the wide angle camera function and the telescopic camera function.

To achieve the above object, there is provided a lens select device comprising: a lens support member having a gear part at one end part and a first lens and a second lens which are juxtaposed at the other end part, when the first gear part is turned, the first lens or the second lens is aligned with a predetermined position; and an operation part for switching the lens to be aligned with the predetermined position to the first lens or the second lens when the operation part engages with the gear part and turns the gear part. With such a construction, a lens for imaging a picked-up image on one image pick-up element may be switched in a compact construction.

Preferably, the operation part includes an arcuate member which turns about a position different from a rotational center of the gear part, and has teeth on the inner peripheral surface which are in mesh with the gear part. With such a feature, a force to rotate the gear part may be transmitted by turning the arcuate member, and hence the gear part may smoothly be operated.

More preferably, a housing is provided which has a first support shaft serving as the rotational center of the lens support member, and a second support shaft serving as a rotational center of the operation part. The operation part includes an elongated hole through which the first support shaft passes, the elongated hole allowing the operation part to rotate about the second support shaft. The inside diameter of the arcuate member is larger than the outside diameter of the first tooth part. With such a construction, a lens mounting portion of the lens support member is greatly swung by merely applying a small force to the arcuate member, and moving the arcuate member by a small sliding quantity. Accordingly, the lens of a large diameter may be mounted.

More preferably, positioning marks are respectively formed on the gear part and the arcuate member. With this feature, the assembling and positioning of the lens select device are easy.

The lens select device may further includes: a plurality of ribs provided on one side surface of the gear part, the ribs being coaxial with the gear part and being rotatable together the gear part; and a thin plate spring being fixed and having a protrusion which faces the one side surface of the gear part being rotating, with rotation of the gear part, the protrusion engaging into or disengaging from a gap between the ribs. With this feature, a click feeling may be produced through engagement of protrusion with the gap when the lens is set to first lens select position or the second lens select position.

Preferably, a filter associated with a lens is mounted on the lens support member. Therefore, a filter most suitable for the lens may be installed in a narrow space, and a clear image may be picked up.

A portable information terminal which achieves the above object, is provided with any of the lens select devices as defined above in which a telescopic lens is mounted as the first lens, a wide angle lens is mounted as the second lens, and an infrared light cut filter is mounted as the filter. With this feature, two camera functions, i.e., a telescopic camera function and a wide angle camera function, may be incorporated into a small portable information terminal at low cost.

A portable information terminal which achieves the above object comprises: any of the lens select devices as defined above in which a telescopic lens is mounted as the first lens, a wide angle lens is mounted as the second lens, a visible light cut filter is mounted as a filter associated with the telescopic lens, and an infrared light cut filter is mounted as a filter associated with the wide angle lens; and an iris verifying function which processes an iris image picked up through the telescopic lens to thereby carry out a verification process. With this feature, the portable information terminal having the iris verifying function is manufactured at low cost.

BRIEF DESCRIPTION OF THE DRAWINGS

FIG. 1 is a view showing an external appearance of a foldable portable telephone set on which a lens select device according to an embodiment of the invention is mounted.

FIG. 2 is a model diagram showing a lens select device, which is the embodiment of the present invention.

DESCRIPTION OF THE PREFERRED EMBODIMENTS

Figure 3:
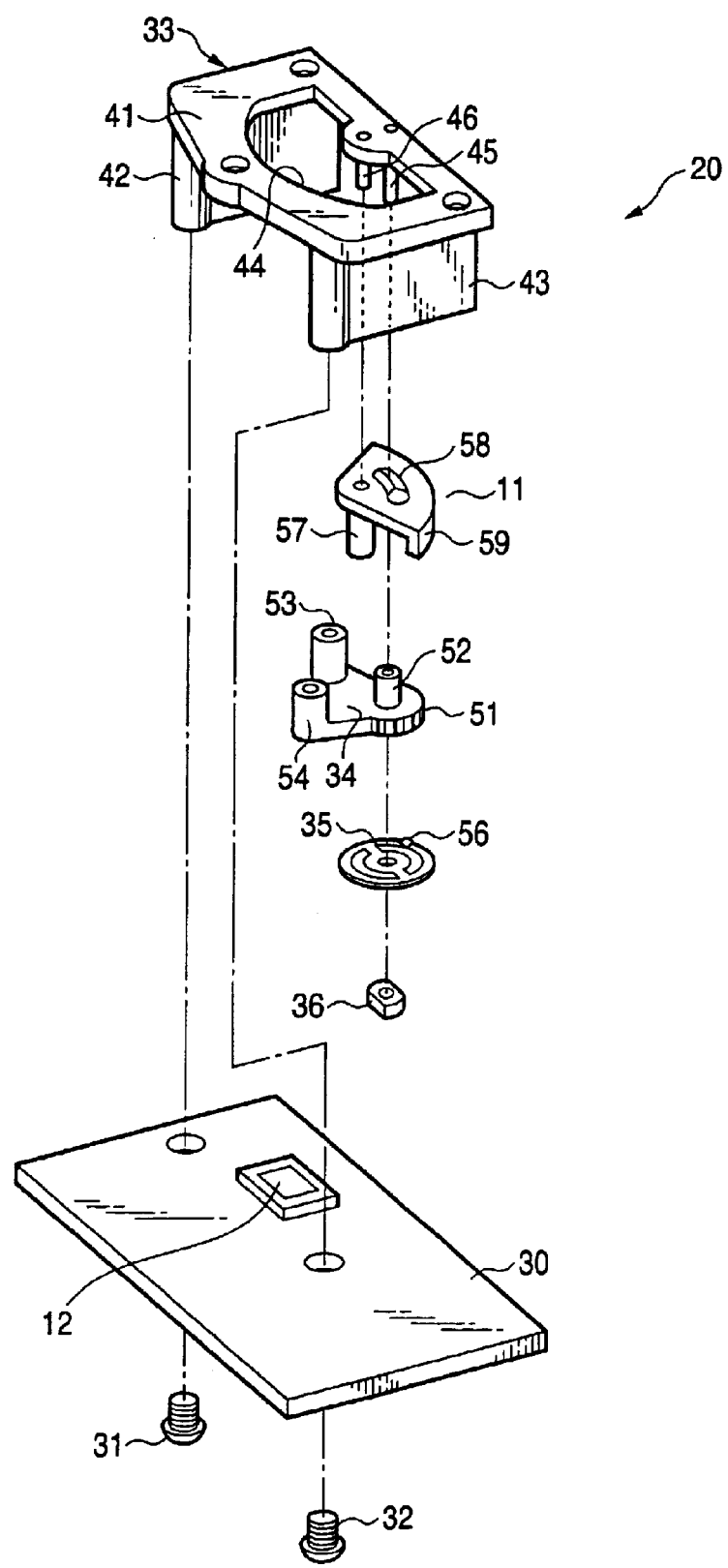
FIG. 3 is an exploded perspective view showing the lens select device, which is the embodiment of the invention.

An embodiment of the present invention will be described with reference to the accompanying drawings.

FIG. 1 is a view showing an external appearance of a foldable portable telephone set having an iris verifying function on which a lens select device according to an embodiment of the invention is mounted. FIG. 1(*a*) is a front view showing the foldable portable telephone set when it is folded, and FIG. 1(*b*) is a front view showing the portable telephone set when it is unfolded. The foldable portable telephone set 1 includes a first main body 1*a* and a second main body 1*b*, which are foldably coupled to each other. An input operation button 2 and a microphone 3 are provided on the first main body 1*a*. A main liquid crystal display (LCD) section 4 is provided on the front side of the second main body 1*b* (the surface of the second main body which is exposed when the telephone set unfolded and is hidden when it is folded, will be referred to as the front side, and the surface of the second main body which is exposed even when it is folded will be referred to as the back side). A sub-LCD section 5 is provided on the back side of the second main body 1*b*, and in this instance, an antenna 6 is provided protruding from the second main body 1*b*.

An earphone speaker 7 is provided on the top of the front side of the second main body 1*b*, and a lens select device 20 to be described in detail later is provided at the lower right corner of the second main body 1*b*. A lens hole 10 is provided at the front position of the lens select device 20 of the second main body 1*b*. A lens that moves to the position of the lens hole 10 is switched to a wide angle lens or a telescopic lens by manual rotation operations of the knurl 11 in the directions of arrows A.

A light emitting element for emitting near infrared light, LED 8 in this instance, is provided near the lens hole 10. It is lit on when an iris image is picked up by a telescopic lens, and it illuminates the iris of the user. In this instance, the lens select device 20 is provided at the right lower corner of the second main body of the foldable portable telephone set 1. However, the lens select device 20 may be located at any desired position.

FIG. 2 is a model diagram showing a pickup device 9 having the lens select device 20, which is the embodiment of the present invention. The pickup device 9 includes a solid-state image pickup element 12, such as CCD or CMOS, and the lens select device 20 which is provided in front of the solid-state image pickup element 12, and slides with a rotational operation of the knurl 11 in the directions of arrows A.

In the lens select device 20, a telescopic lens 21 having a narrow field angle and a wide angle lens 22 having a wide field angle are disposed side by side. One of the telescopic lens 21 and the wide angle lens 22 is selectively moved to a position in front of the solid-state image pickup element 12 by manually selecting the knurl 11. Within the lens select device 20, a visible light cut filter 23 is provided while being superimposed on the telescopic lens 21, and an infrared light cut filter 24 is provided while being superimposed on the wide angle lens 22.

When an iris image of an object to be verified is picked up, a near infrared light basis image is most suitable for the iris image. Accordingly, the visible light cut filter 23 is superimposed on the telescopic lens 21. Further, to make up for the near infrared light which is little contained in natural light, the LED 8 for near infrared light emission is provided on the foldable portable telephone set 1 of the embodiment. When a clear scenery image or the like is picked up, the unnecessary infrared light is to preferably be cut. Accordingly, the infrared light cut filter 24 is superimposed on the wide angle lens 22.

To carry out an iris verifying process by use of the portable telephone set 1, a possessor of the portable telephone set 1, viz., a person to be verified, opens the portable telephone set 1, sets the knurl 11 to a telescopic lens select position, and moves his eye to a position within a range from 5 to 15 cm from the lens hole 10. As a result, the iris image of the verified person, which was picked up by the solid-state image pickup element 12, is loaded into the portable telephone set 1. A verification code is generated from an in-focus iris image and is compared with a verification code registered in advance, whereby it is judged whether or not the verified person is a valid user of the portable telephone set 1.

When the portable telephone set 1 is used in a television telephone mode, for example, the possessor of the portable telephone set 1 opens the portable telephone set 1, sets the knurl 11 to a wide angle lens select position, and moves the lens hole 10 apart from his face by about 30 cm. And the possessor originates a call to a called party, and after the line is set up, he makes a normal conversation with the called party. A moving picture of the possessor himself, which is picked up by the solid-state image pickup element 12 through the wide angle lens 22, is transmitted to the called party, and a moving picture of the called party which is transmitted from the called party is displayed on the main liquid crystal display section 4.

FIG. 3 is an exploded perspective view showing the lens select device 20 according to the embodiment of the invention. The lens select device 20 is made up of a support housing 33, a lens support member 34, a knurl 11, a thin plate spring 35, and a mounting screw 36. The support housing 33 is fixed, by means of screws 31 and 32, to a base board 30 on which the solid-state image pickup element 12 is mounted. The telescopic lens 21 and the wide angle lens 22 are mounted on the lens support member 34, as will be described in detail later. The knurl 11 increases a speed of rotational operation of the lens support member 34. The thin plate spring 35 creates a click feeling in setting the lens support member 34 to a wide angle lens select position or a telescopic lens select position. The mounting screw 36 is used for mounting the thin plate spring 35, the lens support member 34, and the knurl 11 on the support housing 33.

The support housing 33 is formed with a ceiling plate 41 and right and left side walls 42 and 43. The side walls 42 and 43 are fastened at the bottoms to the base board 30 by means of screws 31 and 32. An arcuate hole 44 is formed in the ceiling plate 41. Through the arcuate hole 44, the telescopic lens 21 and the wide angle lens 22, which are mounted on the lens support member 34, are aligned with a predetermined position, i.e., the lens hole 10 shown in FIG. 1.

A first support shaft 45, which protrudes to the base board 30, is provided on the ceiling plate 41. The "arcuate shape" of the hole 44 is formed about the support shaft 45. A second support shaft 46, while being parallel with the support shaft 45, is protruded from the ceiling plate 41 to the base board 30 at a position closer to the arcuate hole 44 than the support shaft 45.

The lens support member 34 is shaped like a fan, and a small gear 51 is formed along a pivotal part of one end of the fan shaped lens support member. An annular boss 52 into which the support shaft 45 is to be inserted is protruded from the central part of the small gear (first tooth part) 51 toward the support housing 33. Lens-housing boss parts 53 and 54, while being juxtaposed, are protruded from the other end of the lens support member 34 toward the support housing 33. The telescopic lens 21 is housed in the lens-housing boss part 53 as will be described in detail later. The wide angle lens 22 is housed in the lens-housing boss part 54 as will be described in detail later. The lens-housing boss parts 53 and 54 are equidistantly spaced from the annular boss 52.

The knurl 11, which is mounted between the lens support member 34 and the support housing 33, is shaped like a fan. An annular boss 57 is protruded from the pivotal position of the fan-shaped knurl. The annular boss is protruded to the lens support member 34 and its tip comes in sliding contact with the surface of the lens support member 34. The support shaft 46 protruded from the support housing 33 is inserted into the annular boss. An elongated hole 58, relatively short, is formed in the knurl 11, while being arcuate about the annular boss 57. The support shaft 45 protruded from the support housing 33 is fit into the annular boss 52 of the lens support member 34, through the elongated hole 58.

A flange part (arcuate member) 59 extends from an extend of the peripheral edge of the fan-shaped knurl toward the lens support member 34. A gear is formed on the inner peripheral surface of the inscribed gear 59. The gear is larger in diameter than the small gear 51, and comes in mesh with the small gear 51. The inscribed gear 59 will be referred to as an inscribed gear 59, hereunder.

Figure 4:
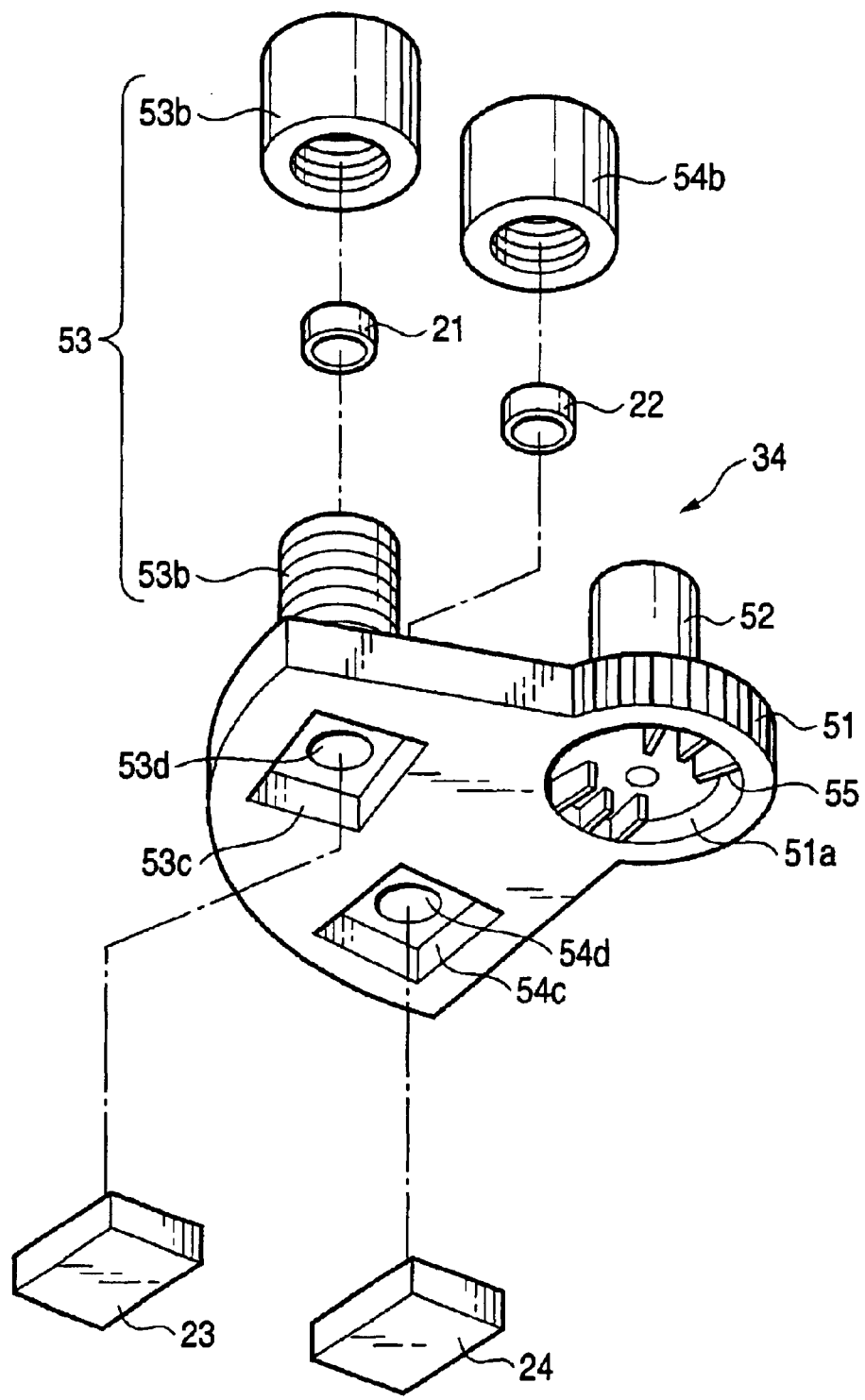
FIG. 4 is an exploded perspective view showing a lens support member used for the lens select device, which is the embodiment of the invention.

FIG. 4 is an exploded perspective view showing the lens support member 34. The lens-housing boss part 53, which is provided on the lens support member 34, is formed with a male screw part 53a integrally formed with the lens support member 34, and a holder part 53b screwed to the male screw part 53a. A through-hole 53d is formed in the male screw part 53a, while ranging from a filter receiving recess 53c formed in the bottom of the lens support member 34 to the top of the male screw part 53a. A through-hole 53e is formed also in the top part of the holder part 53b (see FIG. 8, not shown in FIG. 4).

When the holder part 53b is screwed to the male screw part 53a, the telescopic lens 21 is held between them. The visible light cut filter 23 is received in the filter receiving recess 53c. The lens-housing boss part 54 has also the same structure. When a holder 54b is coupled to it, the wide angle lens 22 is held, and an infrared light cut filter 24 is received in a filter receiving recess 54c.

A disc-like hole 51a, coaxial with the small gear 51, is formed in the bottom of the small gear 51 of the lens support member 34. Three sets of opposed ribs 55 are provided within the hole 51a. The thin plate spring 35 having a protrusion 56 protruded from the surface is applied to the hole 51a, as shown in FIG. 3. The thin plate spring 35 is fixed to the tip of the support shaft 45 by means of the screw 36.

With provision of the ribs 55 and the protrusion 56 of the thin plate spring 35, when the protrusion 56 moves to a gap between the adjacent ribs 55, and engages with the ribs, that is, when the lens support member 34 is turned to the wide angle lens select position or the telescopic lens select position, a click feeling by the engagement is transmitted to the finger operating the knurl 11.

Figure 5:
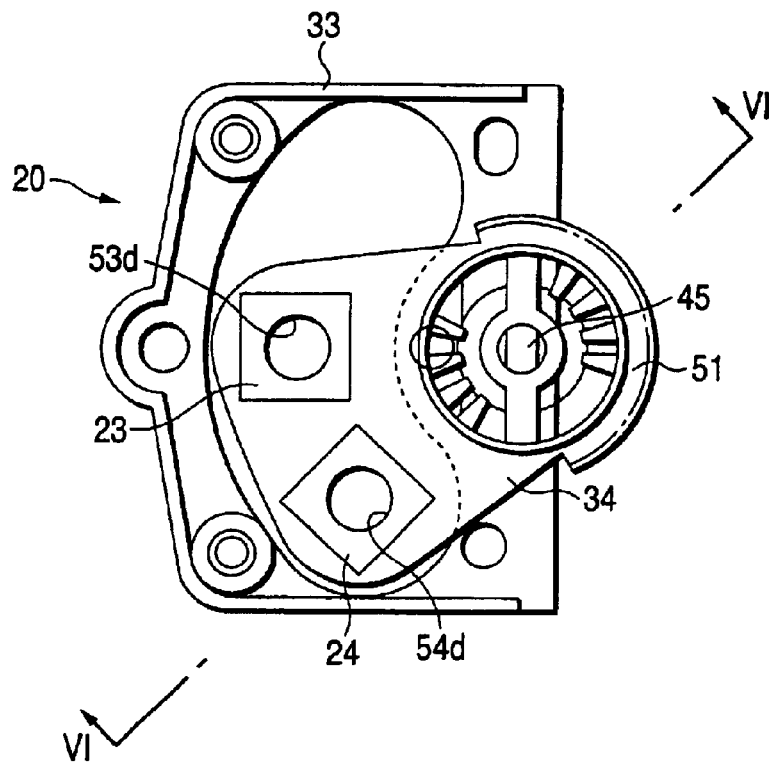
FIG. 5 is a bottom view showing the lens select device, which is the embodiment of the invention, in a state that a knurl is omitted.
Figure 6:
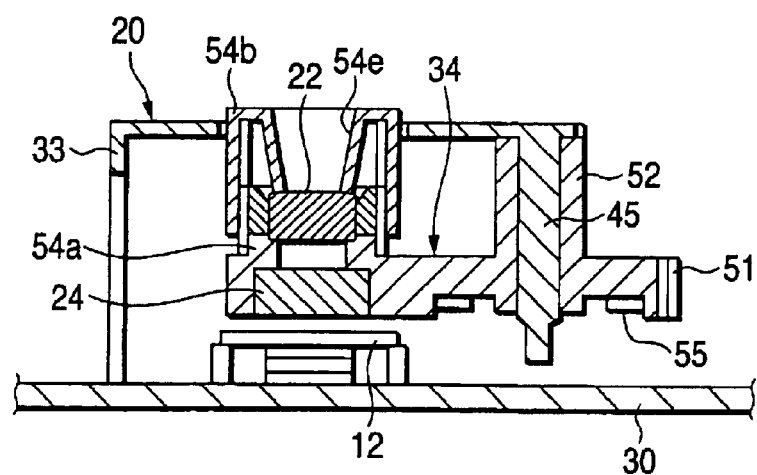
FIG. 6 is a cross sectional view showing the lens select device which is the embodiment of the invention, which the view is taken on line VI—VI in FIG. 5.
Figure 7:
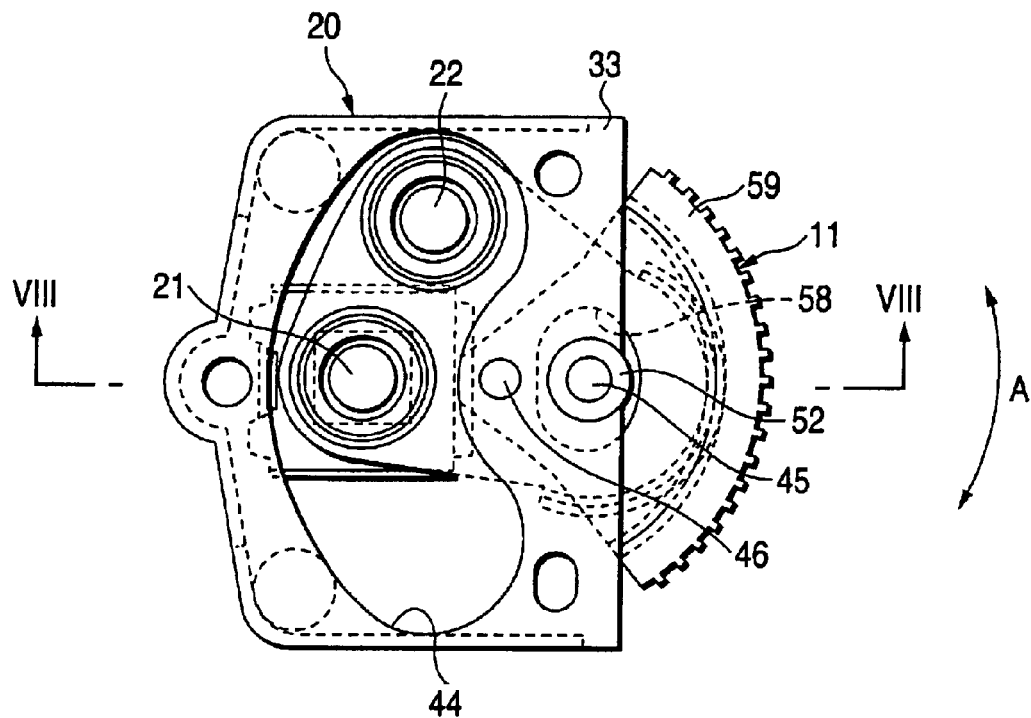
FIG. 7 is a top view showing the lens select device, which is the embodiment of the invention.
Figure 8:
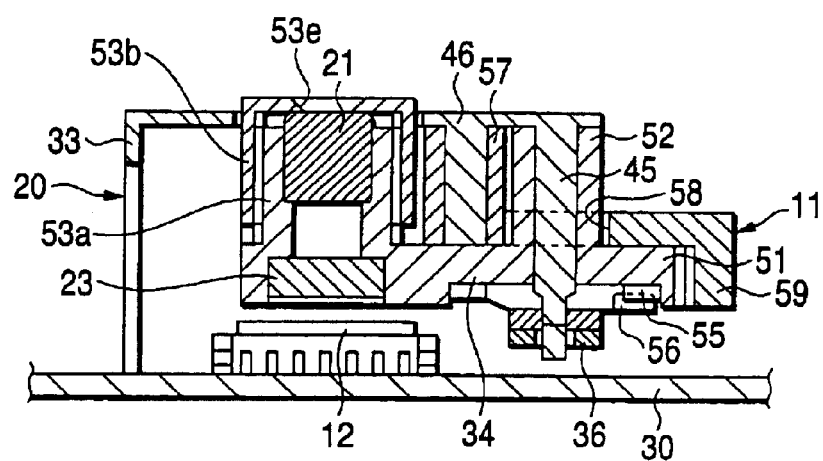
FIG. 8 is a cross sectional view showing the lens select device which is the embodiment of the invention, which the view is taken on line VIII—VIII in FIG. 7.

FIG. 5 is a bottom view showing a state that the lens support member 34 is assembled to the support housing 33 (the knurl 11 is not illustrated). FIG. 6 is a cross sectional view taken on line VI—VI in FIG. 5. FIG. 7 is a top view showing a state that the lens support member 34 and the knurl 11 are assembled to the support housing 33. FIG. 8 is a cross sectional view taken on line VIII—VIII in FIG. 7. FIG. 6 is a cross sectional view showing a portion in which the wide angle lens 22 is housed. FIG. 8 is a cross sectional view showing a portion in which the telescopic lens 21 is housed.

When an image is picked up by use of the telescopic lens 21, an optical path ranging from the lens surface to the solid-state image pickup element 12 is selected to be long so that an image formed by enlarging an image picked up at a narrow field angle at high magnification is imaged on the solid-state image pickup element 12. When an image is picked up by used of the wide angle lens 22, the optical path ranging from the lens surface to the solid-state image pickup element 12 is selected to be short so that a picked-up image falling within a wide field angle is imaged on the solid-state image pickup element 12. The length of the optical path is adjusted at the lens mounting positions in the male screw parts 53a and 54a.

Operation of selecting the wide angle lens 22 or the telescopic lens 21 for the image pick-up lens is performed by moving the inscribed gear 59 forming the outer peripheral wall of the knurl 11 in the directions of arrows A, as shown in FIG. 7. When a force is applied to the knurl 11 in any of the directions of arrows A, the knurl 11 is turned about the support shaft 46.

With the turn of the knurl 11, the small gear 51 of the lens support member 34, which inscribes the inscribed gear 59 of the knurl 11, rotates about the support shaft 45, and the lens-housing boss parts 53 and 54, which are opposed to the small gear 51 with respect to the support shaft 45, greatly move. And, the wide angle lens 22 or the telescopic lens 21 as is selected is aligned with the lens hole 10 shown in FIG. 1. An excessive turning of the small gear 51 is curbed in a manner that the lens-housing boss parts 53 and 54 are brought into contact with the end wall of the arcuate hole 44 formed in the support housing 33. At the same time, an excessive turning of the knurl 11 is curbed in a manner that the end wall of the elongated hole 58 provided in the knurl 11 is brought into contact with the annular boss 52 through which the support shaft 45 is passed.

The inside diameter of the inscribed gear 59 that the small gear 51 inscribes is larger than the outside diameter of the small gear 51. Accordingly, by slightly turning the knurl 11 by applying a small force to the knurl, the small gear 51 greatly turns to perform the lens selection. With this, even if the lens select device 20 is designed to have a structure that the lens select device is compact as a whole, the wide angle lens 22 having a relatively large diameter and the telescopic lens 21 may be mounted thereon. Further, in the embodiment, the small gear 51 is not directly and manually operated. The inscribed gear 59 is provided which circumscribes the small gear 51 and increases the rotational speed of the small gear 51. Therefore, less force and less manipulation amount are needed for the lens selecting operation. In this respect, the operability is improved.

Figure 9:
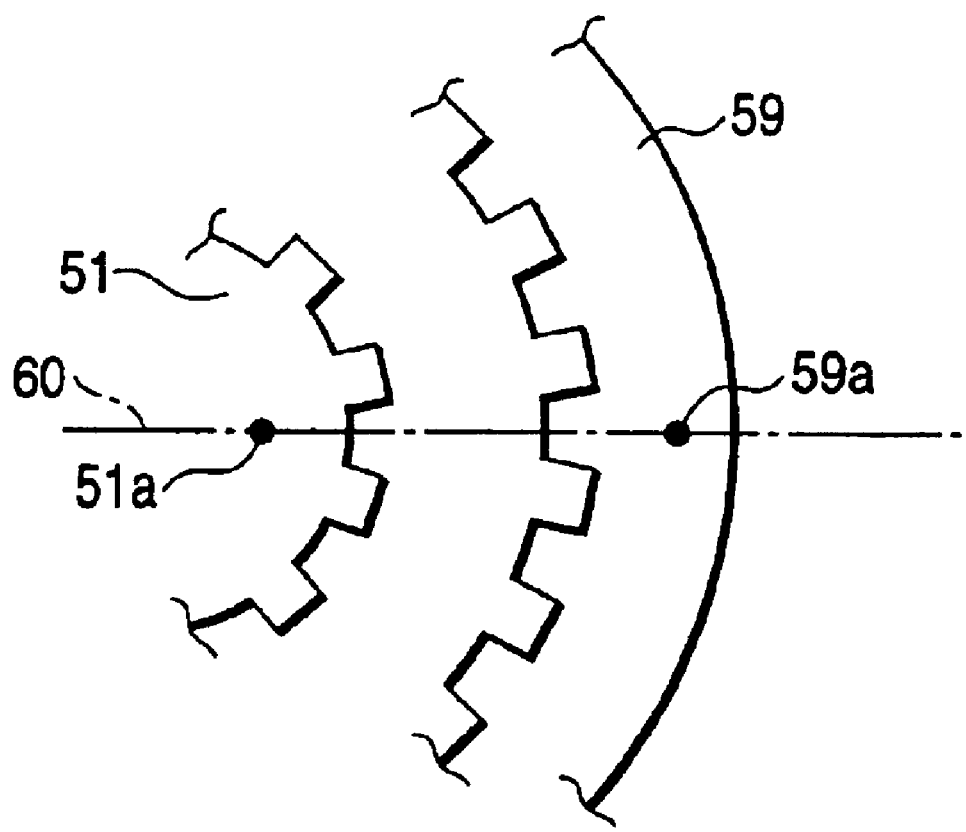
FIG. 9 is an explanatory diagram for explaining a relative positioning of the knurl and the small gear in the lens select device, which is the embodiment of the invention.

To adjust an operation position of the knurl 11, viz., a position on the portable telephone set 1 shown in FIG. 1 on which the knurl 11 is mounted, to a position suitable for manual operation, it is necessary to accurately and relatively position the inscribed gear 59 and the small gear 51 in the stage of assembling the lens select device 20. To the positioning of them, in the embodiment, as shown in FIG. 9, the small gear 51 and the inscribed gear 59 are marked, in advance, with dots 51a and 59a, and the small gear 51 and the knurl 11 are assembled onto a support housing 33 so that the dots 51a and 59a are put on a line 60 connecting the support shafts 45 and 46 (see FIG. 7). As a result, the relative positioning of the small gear and the inscribed gear is easy and the assembling work is easy.

By mounting the lens select device of the embodiment on the portable information terminal, two camera functions, i.e., the iris verification function and the wide angle camera function, are realized by using one solid-state image pickup element. Accordingly, there is no need of additionally using a special camera function exclusively used for picking up an iris image. As a result, the iris verification function may be realized at low cost. Further prevalence of the iris verification is realized.

In the embodiment mentioned above, the inscribed gear 59 of the knurl 11 circumscribes the small gear 51 in the form of an arcuate member which turns about the support shaft 46. In an alteration, only the inscribed gear 59 is taken out and reshaped into a linear rack member. The rack member is slidably mounted on the housing of the portable telephone set 1 or the lens support member of the lens select device. By manually sliding the rack member, the small gear 51 which engages with the rack member is turned.

In the embodiment mentioned above, the camera function for iris verification is incorporated into the foldable portable telephone set. It is evident that the portable information terminal is not limited to the portable telephone set, but may be another type of PDA or a simple portable telephone. Further, the portable telephone set is not limited to the foldable one, but may be any of portable telephone sets which are not of the foldable type. Furthermore, the telescopic lens is not limited to the use of picking up an iris image, but may be used for picking up an enlarged image of a scenery image.

As seen from the foregoing description, the present invention succeeds in providing a lens select device and a portable information terminal in which two types of lenses may be housed in a small housing. By using one of those lenses for picking up an iris image, the portable information terminal is realized which has an iris verifying function, and is low in cost and high in security function.

What is claimed is:

1. A lens select device comprising:
    a lens support member having a first tooth part at one end part and a first lens and a second lens which are juxtaposed at another end part, when said first tooth part is turned, said first lens or said second lens is positioned at an image pick-up position; and
    an operation part for selecting said first lens or said second lens to be positioned at said image pick-up position when said operation part engages with said first tooth part and turns said first tooth part.

2. A lens select device according to claim 1, wherein said operation part includes an arcuate member which turns about a position different from a rotational center of said first tooth part, and has a second tooth part on the inner peripheral surface which is in mesh with said first tooth part.

3. A lens select device according to claim 2, wherein a housing is provided which has a first support shaft serving as the rotational center of said lens support member, and a second support shaft serving as a rotational center of said operation part, said operation part includes an elongated hole through which said first support shaft passes, said elongated hole allowing said operation part to rotate about said second support shaft, and the inside diameter of said arcuate member is larger than the outside diameter of said first tooth part.

4. A lens select device according to claim 2 or 3, wherein positioning marks are respectively formed on said first tooth part and said arcuate member.

5. A lens select device according to any of claims 1 to 3, further comprising:
    a plurality of ribs provided on one side surface of said first tooth part, said ribs being coaxial with said first tooth part and being rotatable together with said first tooth part; and
    a thin plate spring being fixed to said lens select device and having a protrusion which faces said one side surface of said first tooth part, with rotation of said first tooth part, said protrusion engaging into or disengaging from a gap between said ribs.

6. A lens select device according to any of claims 1 to 3, wherein a filter associated with a lens is mounted on said lens support member.

7. A portable information terminal being provided with said lens select device as defined in claim 6 in which a telescopic lens is mounted as said first lens, a wide angle lens is mounted as said second lens, and an infrared light cut filter is mounted as said filter.

8. A portable information terminal comprising:
    said lens select device as defined in claim 6 in which a telescopic lens is mounted as said first lens, a wide angle lens is mounted as said second lens, a visible light cut filter is mounted as a filter associated with said telescopic lens, and an infrared light cut filter is mounted as a filter associated with said wide angle lens; and
    an iris verifying function which processes an iris image picked up through said telescopic lens to thereby carry out a verification process.

* * * * *